US006992786B1

(12) United States Patent
Breding et al.

(10) Patent No.: US 6,992,786 B1
(45) Date of Patent: Jan. 31, 2006

(54) METHOD AND SYSTEM FOR ONLINE CREATION AND ORDERING OF CUSTOMIZED MATERIAL FOR PRINTING

(75) Inventors: Emil Breding, Akersberga (SE); Henrik Kihlberg, Stockholm (SE); Mats Lindgren, Stockholm (SE); Niklas Grunbaum, Stockholm (SE)

(73) Assignee: Printon AB, Stockholm (SE)

( * ) Notice: Subject to any disclaimer, the term of this patent is extended or adjusted under 35 U.S.C. 154(b) by 704 days.

(21) Appl. No.: 09/612,919

(22) Filed: Jul. 10, 2000

(30) Foreign Application Priority Data

Jun. 27, 2000 (SE) .................................. 0002412

(51) Int. Cl.
 *G06F 15/00* (2006.01)
 *G06F 17/00* (2006.01)
(52) U.S. Cl. .................... 358/1.15; 358/1.12; 707/100; 707/104.1; 715/500; 715/500.1; 715/501.1; 715/513
(58) Field of Classification Search ............... 358/1.12, 358/1.15, 1.14; 715/513, 522, 526, 527, 715/500, 501.1, 500.1; 345/764; 707/100–104.1
See application file for complete search history.

(56) References Cited

U.S. PATENT DOCUMENTS

| | | | |
|---|---|---|---|
| 6,243,172 B1 * | 6/2001 | Gauthier et al. ........... | 358/1.18 |
| 6,462,756 B1 * | 10/2002 | Hansen et al. ............. | 345/764 |
| 6,509,974 B1 * | 1/2003 | Hansen ...................... | 358/1.12 |
| 6,631,375 B2 * | 10/2003 | Jecha et al. ................... | 707/9 |
| 6,636,242 B2 * | 10/2003 | Bowman-Amuah ......... | 345/764 |
| 6,701,023 B1 * | 3/2004 | Gaither et al. .............. | 382/254 |
| 6,704,120 B1 * | 3/2004 | Leone III et al. .......... | 358/1.18 |
| 6,721,747 B2 * | 4/2004 | Lipkin .......................... | 707/10 |
| 6,748,569 B1 * | 6/2004 | Brooke et al. .............. | 715/523 |
| 6,826,553 B1 * | 11/2004 | DaCosta et al. ............... | 707/1 |

OTHER PUBLICATIONS

Brochure, "W3C Extensiblr Markup Language (SML) 1.0," W3C Recommendation ☐☐Feb. 10, 1998, pp. 1-32.*

* cited by examiner

*Primary Examiner*—Edward Coles
*Assistant Examiner*—Chan S. Park
(74) *Attorney, Agent, or Firm*—Pilllsbury Winthrop Shaw Pittman

(57) ABSTRACT

The present invention relates to a method and a system for online creation and ordering of customized material for printing, where each customer at front end, through a computerized interface, participates in the process of creating, editing, proof printing and finally ordering print-ready files through Internet, via a printing service provider which automates the production of the print-ready files, and where print shops carefully chosen by the printing service provider automatically receives the print-ready files directly into their printing press. A PDF engine uses two XML files to create a customer PDF document for printing on demand. One XML file, the data XML file, comprises the data and it's typing for printing, and is created by the customer through the computerized interface. The second XML file, design XML file, comprises a description of how said data can be positioned and formatted, in a created document by the customer through said interface. The PDF engine generates the print-ready document through providing a new structure by analyzing the two XML files, while analyzing merging data and formatting information, thus making it possible to create a PDF document with a distinct difference between data to be printed and the design of the PDF document.

12 Claims, 2 Drawing Sheets

US 6,992,786 B1

METHOD AND SYSTEM FOR ONLINE CREATION AND ORDERING OF CUSTOMIZED MATERIAL FOR PRINTING

TECHNICAL FIELD

The present invention pertains to a method and a system for allowing a customer to a printing service provider to create a PDF document at the site of the customer through a computerized interface and sending the PDF document to the service provider through a network for data-communication, whereby the service provider directs the PDF document to a suitable printing office through a network for data-communication.

BACKGROUND ART

As most service providers of today are experiencing the markets ever-growing demand for better service, speed and flexibility, it is important also for printing service providers to be able to mix ever-faster services with total/optimal flexibility, to a customer wanting customised printed products at low costs and on short notice, for the printing service providers to be competitive now and in the future.

Many different kinds of businesses and organisations are dependent on a continuous updating/customising of their printed material including: national and regional retail chains wanting to update their point of sale displays, event planners and promoters needing material for promoting different events, as well as every small to major business requiring company designed stationary, business cards, envelopes, letterheads and/or business forms, regulated by the company's graphic profile.

Formerly printing orders were manually sent to commercial printing services, like print shops, having its product going through the stages of: typesetting and proofing, changes to proof, corrections and proofing, customer approval and print production before final delivery and payment. The product was then sent back and forth a couple of times between customer and print shop, which is both time consuming, inflexible and demanded quite a lot of administrative work.

The graphic arts industry is however gradually shifting from analogue to digital techniques, ever so slowly due to the fragmentation of the printing industry. Processes are being simplified through the use of computers, graphic arts equipment and the Internet, which brings about that information flows between customer and print shop can be rationalised and costs reduced.

Some modern printing systems already allows a user to customise printed material on the Internet using template formats, stored reference information and user input data.

The document WO 98/08176 for example shows a system for creating and proofing customised printed material utilising dynamic Portable Document Format (PDF) technology before printing on a production printing system. A user connects to an Internet web site provided by a commercial printing service where he/she then selects from a plurality of available templates for the printed material. Additional pre-stored information to be included can also be selected or the user can input variable information through a keyboard or the like.

The system according to the WO document has some drawbacks in that it does not use PDF through all points of the workflow, which means that the service provider always must have access to a database containing high-resolution images and fonts. Their solution is therefore not stand-alone. They are also further limited, to sending print orders only to service providers connected to their system.

Yet another disadvantage is the fact that the printable matter created with this system is totally template based. The templates are created with a desktop publishing program, most likely "off-line" outside of the actual system presented, a fact which adds on to the inflexibility of this system.

SUMMARY OF THE DISCLOSED INVENTION

The present invention relates to a method and a system for online creation and ordering of customised material for printing, where each customer at front end, through a computerized interface, participates in the process of creating, editing, proof printing and finally ordering print-ready files through Internet, via a printing service provider which automates the production of the print-ready files, and where print shops carefully chosen by the printing service provider automatically receives the print-ready files directly into their printing press.

To achieve aims and objectives the present invention provides a method allowing a customer to a printing service provider to create a PDF document at the site of the customer through a computerized interface. The customer thereafter sends the PDF document to the service provider through a network for data-communication, whereby the service provider directs the PDF document to a suitable printing office through a network for data-communication, comprising:

that a PDF engine creating documents uses two XML files to create a customer PDF document for printing on demand;

one XML file comprises the data and it's typing for printing which is created by the customer through said interface;

the other XML file comprises a description of how said data can be positioned and formatted, in a created document by the customer through said interface;

said PDF engine generating said document through providing a new structure by analyzing the two XML files, while analyzing merging data and formatting information; and thus making it possible to create a PDF document with a distinct difference between data to be printed and the design of the PDF document.

In one embodiment of the method according to the present invention, high-resolution images, fonts and color definitions are embedded in the PDF document and an arbitrary printing office can be used for online printing.

In other embodiments of the method according to the present invention, the design XML describes the layout of the whole PDF document, a questionnaire based on non-static, variable, text elements in the design XML file is created and every non-static text element in the design XML file has a reference to data in the data XML file.

The present invention further sets forth a system allowing a customer to a printing service provider to create a PDF document at the site of the customer through a computerized interface. The customer thereafter sends the PDF document to the service provider through a network for data-communication, whereby the service provider directs the PDF document to a suitable printing office through a network for data-communication, comprising:

that a PDF engine means creating documents uses two XML files to create a customer PDF document for printing on demand;

one XML file comprises the data and it's typing for printing which is created by the customer through said interface;

the other XML file comprises a description of how said data can be positioned and formatted, in a created document by the customer through said interface;

said PDF engine means generating said document through providing a new structure by analyzing the two XML files, while analyzing merging data and formatting information; and thus making it possible to create a PDF document with a distinct difference between data to be printed and the design of the PDF document.

In one embodiment of the system according to the present invention, high-resolution images, fonts and color definitions are embedded in the PDF document and an arbitrary printing office can be used for online printing.

In other embodiments of the system according to the present invention, the design XML describes the layout of the whole PDF document, a questionnaire based on non-static, variable, text elements in the design XML file is created and every non-static text element in the design XML file has a reference to data in the data XML file.

XML (EXtensible Markup Language) is an open standard for describing data from the W3C, world-wide-web consortium. It is used for defining data elements on a web page and business-to-business documents. It uses a similar tag structure as HTML; however, whereas HTML defines how elements are displayed, XML defines what those elements contain. HTML uses predefined tags, but XML allows tags to be defined by the developer of the page. Thus, virtually any data items, such as product, sales rep and amount due, can be identified, allowing web pages to function like database records.

BRIEF DESCRIPTION OF THE DRAWINGS

Henceforth reference is had to the attached figures and table for a better understanding of the present invention and its examples and embodiments, wherein.

TABLE

The table illustrates examples of design XML definitions according to the present invention.

DETAILED DESCRIPTION OF PREFERRED EMBODIMENTS

The present invention sets forth a method and a system for creating and ordering customised material for printing, wherein each customer can create, modify, proof, procure and manage their printed material from their desktop computer.

Figure 1:
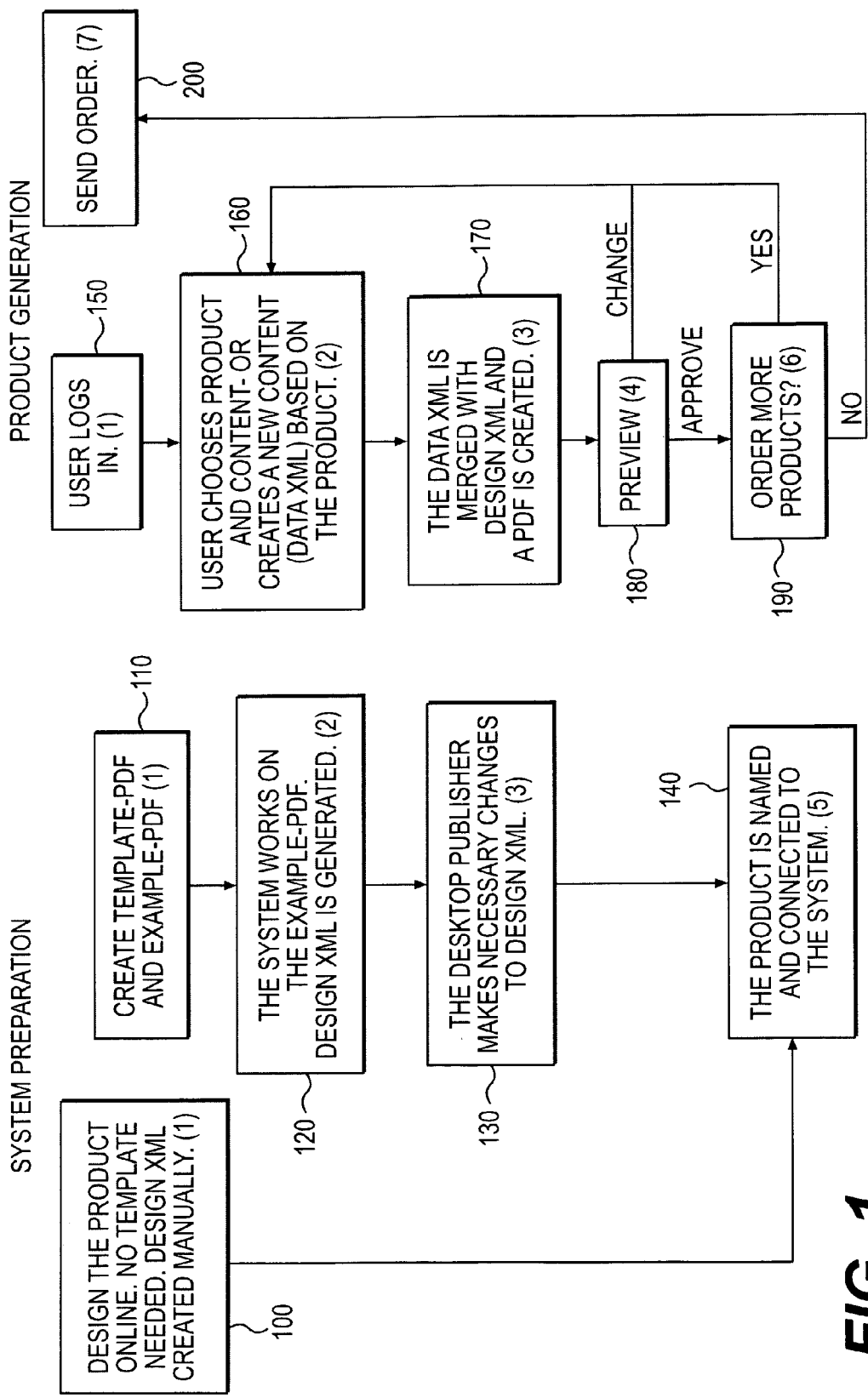
FIG. 1 illustrates one embodiment of a flow chart for system preparation and product generation, leading to a customised printed product according to the present invention.

FIG. 1 schematically illustrates how a user preferably via his/her computer connects, logs on, to a printing service provider on a network for data-communication, like an Internet site, where he/she might have a password-protected account, and where he/she interacts with the printing service provider for creating and ordering customised printed material.

The printing service provider has created example- and/or template PDF files 110, which are user specific meaning that all information needed for creating said PDF files are provided by each user online. The template PDF file only contains the elements that are to be static in a print-ready document. This could be data that mostly refers to layout and not, for example, data referring to name and telephone number on a business card.

The example PDF file contains all the data needed in a print-ready document for end use and is with a program that analysis the layout and design of the example PDF file, used to generate the design XML file 120, in which all data elements are identified and their individual positions registered, specifying which element data that are to be dynamic, variable, and which to be static, not variable. Necessary changes can thereafter also manually be made to the design XML file, for further customisation. The design XML file thus describes the layout of the whole PDF document containing information about where data is to be placed and how it is formatted.

The design XML file can describe whole or part of a print-ready document and if the XML file only describes the pure dynamic part of a document, a template PDF file is needed to define the documents static part.

The design XML file, "product", can however also be manually created from scratch directly online the printing service providers website 100, either by an end user himself/herself or by the printing service provider. See example of a design XML file below.

The "product", which either constitutes the design XML file and template PDF file together or the design XML file alone, is then named and connected to the system 140, i.e. made available for the user online.

When a user logs on to a printing service provider on a network for data-communication 150, for example an Internet website, he/she can choose "product" and "content", data XML file, or create a new "content", data XML file, based on the "product" 160.

A data XML file contains the content, dynamic data, to be placed on the "product". The creation of the data XML file, or product content, is done by user input. When a user for the first time enters the system, logs on, there is no previous "content". A questionnaire based on the non-static, dynamic, text elements in the design XML file is then created. When data is entered and stored the user has access to this for any later session.

The data XML file explicitly contains data and its type. The typing of data means that the any text is associated with a type. This enables the extraction and insertion of data in a content specific way. If the data XML file for a specific user contains the entry "+46 8 748 84 33", this entry is also marked with the content "Telephone number". If the user wishes to change this, the system can present a question specifying for a new telephone number and not an undefined data. See example of a data XML file below.

The design XML file is then merged with the data XML file in a PDF-engine, which analyses both XML files, combines them, and generates a print-ready PDF document file, specific for the current user 170. Every non-static, i.e. dynamic, TXTELEM, text element, in the design XML file has a reference to data in the data XML file. This reference is named in the "description" attribute of the TXTELEM in the table below.

The two XML files define all documents that are created by the PDF-engine. The first of these, the design XML, contains information about how the document is constructed. The other, data XML, contains the user specific data that is to be inserted in the document. The PDF format does not differentiate content and data. With this XML solution the data is separated from content, something that earlier has been unheard of in PDF contexts.

A user at the front end, via his/her computer screen, can then online the printing service providers website preview a print-ready PDF document and/or it can be proof-printed at the front end on his/her local printer for closer manual inspection 180. If a user is satisfied with the result, he/she can approve the PDF and request a print-order for the PDF online the printing service providers website. If a user is not satisfied he/she can return to choosing a new "product" and/or "content" 160 and repeat the steps above until a satisfactory result is reached.

After approval of the print-ready PDF document, a user can either choose to order one more product 190, i.e. return to choosing a new "product" and/or "content" 160 or he/she can send print orders for the approved PDF document/documents 200.

The printing service provider can then direct the print-ready PDF document file to a suitable print shop, or the like, through a network for data-communication, like the Internet. High-resolution images, fonts and color definitions are embedded in the PDF document, PDF technology is used through all points of the workflow, and the printing service provider is therefore not restricted to certain print shops with access to databases containing such information. Their solution is stand-alone and they are therefore not limited, to sending print orders only to print shops connected to their system, but can send print orders to arbitrary print shops.

The customers can also follow up on their orders, online, until final delivery.

Figure 2:
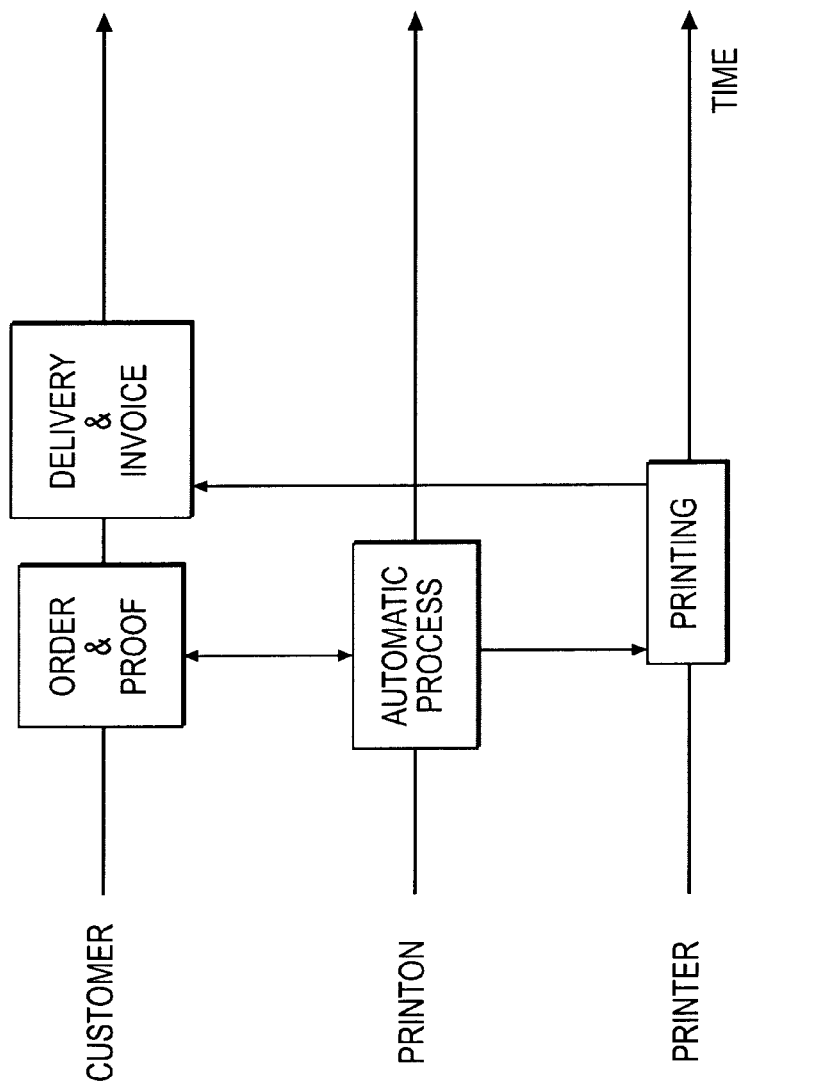
FIG. 2 illustrates possible online interactions between customer, printing service provider and print shop, leading to a delivered and paid printed product.

FIG. 2 schematically illustrates possible online interactions between customer, printing service provider and printer, print shop, leading to a delivered and paid printed product.

Example of a data XML file:

```
<?xml version="1.0" encoding="UTF-16"?>
<CUSTOMERDATA>
        <Förnamn>Kalle</Förnamn>
        <Efternamn>Andersson</Efternamn>
        <Titel>System Engineer</Titel>
        <Telefon>406 62 03</Telefon>
        <Mobil>736 82 10 28</Mobil>
        <Epost>emil.breding</Efternamn>
</CUSTOMERDATA>
```

Example of a design XML file:

```
<?xml version="1.0" encoding="UTF-16"?>
<PRODUCT imposement="0">
   <PAGE pageNo="1">
      <ROWELEM alignment="right" flipX="false" flipY="false" posX="232" posY="75" rotation="0">
         <TXTELEM color="0 0 0 1 k" cs="0" description="Förnamn" flipX="false" flipY="false" font="ArialMT" size="12" static="false" ws="0"></TXTELEM>
         <SPACEELEM>4</SPACEELEM>
         <TXTELEM color="0 0 0 1 k" cs="0" description="Efternamn" flipX="false" flipY="false" font="ArialMT" size="12" static="false" ws="0"></TXTELEM></ROWELEM>
      <ROWELEM alignment="right" flipX="false" flipY="false" posX="232" posY="65" rotation="0">
         <TXTELEM color="0 0 0 1 k" cs="0" description="Titel" flipX="false" flipY="false" font="ArialMT" size="7" static="false" ws="0">
            <OPTION>System Engineer</OPTION>
            <OPTION>Marketing Director</OPTION>
            <OPTION>Managing Director</OPTION>
            <OPTION>Project Manager</OPTION>
            <OPTION>Information Manager</OPTION></TXTELEM></ROWELEM>
      <ROWELEM alignment="right" flipX="false" flipY="false" posX="232" posY="49" rotation"0">
         <TXTELEM color="0 0 0 1 k" cs="0" description="Gata_stat" flipX="false" flipY="false" font="ArialMT" size="7" static="true" ws="0">Tegnérgatan 35</TXTELEM></ROWELEM>
      <ROWELEM alignment="right" flipX="false" flipY="false" posX="232" posY="31" rotation="0">
         <TXTELEM color="0 0 0 1 k" cs="0" description="Telefon_stat" flipX="false" flipY="false" font="ArialMT" size="7" static="true" ws="0">phone +46-(0)8-</TXTELEM>
         <TXTELEM color="0 0 0 1 k" cs="0" description="Telefon" flipX="false" flipY="false" font="ArialMT" size="7" static="false" ws="0"></TXTELEM></ROWELEM>
      <ROWELEM alignment="right" flipX="false" flipY="false" posX="232" posY="22" rotation="0">
         <TXTELEM color="0 0 0 1 k" cs="0" description="Mobil_stat" flipX="false" flipY="false" font="ArialMT" size="7" static="true" ws="0">mobile +46-(0)</TXTELEM>
         <TXTELEM color="0 0 0 1 k" cs="0" description="Mobil" flipX="false" flipY="false" font="ArialMT" size="7" static="false" ws="0"></TXTELEM></ROWELEM>
      <ROWELEM alignment="right" flipX="false" flipY="false" posX="232" posY="13" rotation="0">
         <TXTELEM color="0 0 0 1 k" cs="0" description="Epost" flipX="false" flipY="false" font="ArialMT" size="7" static="false" ws="0"></TXTELEM>
         <TXTELEM color="0 0 0 1 k" cs="0" description="Epost_stat" flipX="false" flipY="false" font="ArialMT" size="7" static="true" ws="0">@printon.com</TXTELEM></ROWELEM>
      <ROWELEM alignment="right" flipX="false" flipY="false" posX="232" posY="40" rotation="0">
```

-continued

```
<TXTELEM color="0 0 0 1 k" cs="0" description="Post_stat" flipX="false" flipY="false"
font="ArialMT" size="7" static="true" ws="0">111 61 Stockholm, Sweden</TXTELEM></ROWELEM>
  </PAGE>
</PRODUCT>
```

Means mentioned in the present description can be software means, hardware means or a combination of both.

The present invention has been described with non-limiting examples and embodiments. It is the attached set of claims that describe all possible embodiments for a person skilled in the art.

Table showing examples of design XML definitions:

| Element tag | Attribute | Description |
|---|---|---|
| PRODUCT | templatePressFile | If template exists this is a file reference to the press template. |
|  | templatePreviewFile | If template exists this is a file reference to the preview template. |
|  | resourceFile | This is a file reference to fonts and colours used to create the finished product. |
|  | imposement | The imposement of the file sent to press. |
| PAGE | pageNo | Defines at what page the following rows are placed in. |
| ROWELEM | PosX | Position in X axis |
|  | PosY | Position in Y axis |
|  | Rotation | Rotation in degrees. |
|  | FlipX | True if the row is to be flipped X wise. |
|  | FlipY | True if the row is to be flipped Y wise. |
|  | Alignment | Right, left or center |
| TXTELEM | Color | Color of text |
|  | Cs | Character spacing |
|  | Ws | Word spacing |
|  | FlipX | True if the row is to be flipped X wise. |
|  | FlipY | True if the row is to be flipped Y wise. |
|  | Font | Font for text |
|  | Size | Font size |
|  | Static | True if user will not be able to change the value of this TXTELEM |
|  | Description | This is the reference to the data XML. |

What is claimed is:

1. A method for allowing a customer of a printing service provider to create a customer PDF document through a computerized interface and send the customer PDF document to the service provider through a network for data-communication, whereby the service provider directs the customer PDF document to a suitable printing office through the network for data-communication, comprising:
   generating the customer PDF document for printing on demand with a PDF engine using a data XML file and a design XML file,
   wherein the customer PDF document generated using the data and design XML files is generated at the site of the customer,
   wherein the data XML file comprises data and its data type for printing which is created by the customer through said computerized interface,
   wherein the design XML file comprises data formatting information with a description of how said data is to be positioned and formatted in the customer PDF document created by the customer through said computerized interface,
   wherein the data in the data XML file differs from the data formatting information in the design XML file; and
   sending the customer PDF document to the service provider through the network for data-communication,
   wherein generating said customer PDF document comprises analyzing the data and design XML files, and merging data from the data XML file with the formatting information from the design XML file.

2. A method according to claim 1, wherein high-resolution images, fonts and color definitions are automatically embedded in the customer PDF document.

3. A method according to claim 1, wherein an arbitrary printing office for online printing is provided.

4. A method according to claim 1, wherein the design XML file describes a layout of the customer PDF document.

5. A method according to claim 1, wherein a questionnaire based on non-static text elements in the design XML file is created.

6. A method according to claim 5, wherein every non-static text element in the design XML file has a reference to data in the data XML file.

7. A system for allowing a customer of a printing service provider to create a customer PDF document and send the customer PDF document to the service provider through a network for data-communication, whereby the service provider directs the customer PDF document to a suitable printing office through the network for data-communication, comprising:
   a computerized interface; and
   a PDF engine configured to create the customer PDF document for printing on demand using a data XML file and a design XML file,
   wherein the data XML file comprises data and its data type for printing which is created by the customer through said computerized interface,
   wherein the design XML file comprises data formatting information with a description of how said data is to be positioned and formatted in the customer PDF document created by the customer through said computerized interface,
   wherein the data in the data XML file differs from the data formatting information in the design XML file,
   wherein the customer PDF document is generated at the site of the customer,
   wherein said PDF engine is configured to analyze the data and design XML files, and merge data from the data XML file with the formatting, information from the design XML file.

8. A system according to claim 7, wherein high-resolution images, fonts and color definitions are automatically embedded in the customer PDF document.

9. A system according to claim 7, wherein an arbitrary printing office is used for online printing.

10. A system according to claim 7, wherein the design XML file describes a layout of the customer PDF document.

11. A system according to claim 7, wherein a questionnaire based on non-static text elements in the design XML file is created.

12. A system according to claim 11, wherein every non-static text element in the design XML file has a reference to data in the data XML file.

* * * * *